Patented Dec. 27, 1938

2,141,721

UNITED STATES PATENT OFFICE 2,141,721

ARALKYL ETHERS OF HIGH MOLECULAR CARBOHYDRATES

Karl Meinel, Dormagen-I. G. Werk, near Cologne, Germany, assignor to Hercules Powder Company, Wilmington, Del., a corporation of Delaware No Drawing. Application March 26, 1938, Serial No. 198,231. In Germany August 18, 1937

6 Claims. (Cl. 260—1.52)

This invention relates to a process of preparation of aralkyl ethers of high molecular carbohydrates, particularly cellulose.

Aralkyl ethers of cellulose, for example, benzyl cellulose, can, it is shown, be prepared by reacting alkali cellulose wtih aralkyl halides. Herein it is necessary, in order to obtain the desired products having homogeneous solubility in organic solvents, to use a relatively large excess of alkali and aralkyl halide. In doing this, a substantial portion of the halide used is converted into a mixture of the corresponding alcohol and ether. In the preparation of benzyl cellulose, for example, there is formed as a by-product a mixture of benzyl alcohol and dibenzyl ether, called "benzyl oil." Since these by-products must be reworked, and, moreover, since they make difficult the purification of the cellulose ether, it is desirable to prevent their formation as much as possible. This can be done, for example, by the use of smaller quantities of aralkyl halide, but in such a case a uniformly soluble product can no longer be obtained. On the other hand, tests have already been carried out to depress the undesired side reactions by adding the aralkyl halide in several portions, with subsequent addition of alkali, by the co-action of solvents and diluents, but this always requires very long reaction times, in order to produce the desired, homogeneous product.

It has now been found that a particularly advantageous method of aralkylation of cellulose and similar carbohydrates comprises the reaction of alkali cellulose with the aralkyl halide in the presence of cobalt compounds or pentavalent arsenic compounds. In this process relatively small quantities of aralkyl halide (for example, 4 parts by weight to 1 part by weight of cellulose) are used, and the cellulose ether is produced in a relatively short reaction time, and this cellulose ether is homogeneously soluble in the usual organic solvents, such as toluol, xylol, and so forth, and at the same time the quantity of the above mentioned, undesired by-product is substantially reduced.

The compounds of pentavalent arsenic used, in accordance with my invention, should be soluble in the alkali reaction medium, and added, preferably, in aqueous or alkaline solutions of the finished alkali cellulose, before reaction with aralkyl halide, and then kneaded with the alkali cellulose for some time. The quantity to be added can vary within certain limits, for example, amounting to 20–60% of the weight of the cellulose. Moreover, a cobalt compound can be added to the caustic alkali used in the preparation of the alkali cellulose, for example, in the form of a mineral salt, since it dissolves in the alkali, with formation of cobaltate. The required quantity of cobalt compound can be reduced to a small amount, for example, 2% of the weight of the cellulose and below.

Etherification of the cellulose is then accomplished in the usual manner in the presence of an excess of alkali, for example, 1.5 to 3 parts by weight per 1 part by weight of cellulose, with addition of an aralkyl halide. Since only a relatively small excess of the latter is required, and since the reaction mass is, therefore, highly viscous, it is preferable to add a suitable solvent or diluent, for example, benzol, toluol, or particularly dibenzyl ether. The process is further explained in the following examples:

Example 1

One part by weight of cellulose is kneaded with 2–2½ parts by weight of caustic alkali in the form of 30–50% caustic solution for several hours. Then a solution of 0.2–0.6 part by weight of arsenic acid in 5–10 cc. of 40% caustic alkali solution is added and kneaded for some time with the alkali cellulose. Then 3 parts by weight of benzyl chloride and 3 parts by weight of dibenzyl ether are added and the reaction mass heated in the usual way to 110–120° C. After heating 3–5 hours a further addition of 1 part by weight of benzyl chloride and 0.4 part by weight of powdered caustic soda are added and the mixture again heated. After heating 8–12 hours the benzyl cellulose obtained has the desired properties, i. e., it is completely soluble in a mixture of toluol-butanol 9:1.

Example 2

One part by weight of cellulose is kneaded with a solution of 0.025–0.05 part by weight of cobalt nitrate in 2–2½ parts by weight of 35–40% aqueous caustic solution for several hours, then 3 parts by weight of benzyl chloride and 3 parts by weight of dibenzyl ether are added and the reaction mixture heated in the usual manner to 110–120° C. After heating 3–5 hours a further addition of 1 part by weight of benzyl chloride and 0.4 part by weight of powdered caustic soda are added and the mixture again heated. After 8–12 hours heating the benzyl cellulose obtained has the desired properties, i. e., it is completely soluble in a mixture of toluol-butanol 9:1.

*Example 3*

The process is as in Example 2, except that 0.04 part by weight of cobalt chloride are dissolved in the caustic alkali solution before mercerization of the cellulose.

What I claim and desire to protect by Letters Patent is:

1. Process of preparation of aralkyl ethers of carbohydrates, including reacting caustic alkali solution with the carbohydrate to form an alkali carbohydrate, and reacting said alkali carbohydrate with an aralkyl halide in the presence of a metallic compound from the group consisting of cobalt compounds and pentavalent arsenic compounds.

2. Process of preparation of aralkyl ethers of cellulose, including reacting caustic alkali solution with cellulose to form alkali cellulose, and reacting said alkali cellulose with an aralkyl halide in the presence of a metallic compound from the group consisting of cobalt compounds and pentavalent arsenic compounds.

3. Process of preparation of a benzyl ether of cellulose, including reacting caustic alkali solution with cellulose to form alkali cellulose, and reacting said alkali cellulose with benzyl chloride in the presence of a metallic compound from the group consisting of cobalt compounds and pentavalent arsenic compounds.

4. Process of preparation of a benzyl ether of cellulose, including reacting caustic alkali solution with cellulose to form alkali cellulose, and reacting said alkali cellulose with benzyl chloride in the presence of arsenic acid.

5. Process of preparation of a benzyl ether of cellulose, including reacting caustic alkali solution with cellulose to form alkali cellulose, and reacting said alkali cellulose with benzyl chloride in the presence of cobalt nitrate.

6. Process of preparation of benzyl ether of cellulose, including reacting caustic alkali solution with cellulose to form alkali cellulose and reacting said alkali cellulose with benzyl chloride in the presence of cobalt chloride.

KARL MEINEL.